United States Patent [19]

Malmqvist et al.

[11] 4,417,142
[45] Nov. 22, 1983

[54] METHOD AND APPARATUS FOR DETECTING ALPHA-EMITTING SUBSTANCES

[75] Inventors: Erik L. Malmqvist, Skelleftea; Krister Kristiansson, Lund, both of Sweden

[73] Assignee: Boliden Aktiebolag, Stockholm, Sweden

[21] Appl. No.: 267,693

[22] Filed: May 27, 1981

[30] Foreign Application Priority Data

Jun. 9, 1980 [SE] Sweden ............................... 8004273

[51] Int. Cl.³ .......................................... G01V 5/00
[52] U.S. Cl. ................................. 250/253; 250/472.1
[58] Field of Search .............................. 250/253, 472.1

[56] References Cited

U.S. PATENT DOCUMENTS 3,665,194  5/1972  Alter et al. ........................ 250/253
4,053,772  10/1977  Felice ................................ 250/253
4,156,138  5/1979  Felice ................................ 250/253

Primary Examiner—Davis L. Willis
Attorney, Agent, or Firm—Stevens, Davis, Miller & Mosher

[57] ABSTRACT

The invention relates to a method for detecting and measuring alpha-emitting substances, such as radon and/or daughter products of radon, by registering nuclear tracks on a detector. By conducting away during measuring any electrostatic field which may have built-up on the detector, there is eliminated the risk of erroneous information being obtained with respect to the dosage of radiation received.

A device in the form of a dosimeter for carrying out the detecting and measuring method is also provided in accordance with the invention. Arranged on or in the immediate vicinity of the registering surface (1) of the detector is an electrically conductive material (2) which at least partially covers the registering surface. In a preferred embodiment, the dosimeter may include at least one absorber (4) arranged between the registering surface and the electrically conductive material. The electrically conductive layer suitably has a constant potential and may be connected to the ground or to a source of electric voltage (FIG. 4).

8 Claims, 5 Drawing Figures

METHOD AND APPARATUS FOR DETECTING ALPHA-EMITTING SUBSTANCES

The present invention relates to a method and an apparatus for detecting alpha-emitting substances, such as radon and/or daughter products of radon by track registration on a detector.

Radon-222 is a radio active gas emanating from uranium. It is a member of the radio active series which begins with uranium-238 and ends with stable lead-206. Radon-220 or thoron is another form of radon gas produced in the radioactive decay series beginning with thorium-232. Radon-222 has a half-life of 3.82 days, while radon-220 has a half-life of 56 seconds. Both of these gases emit alpha particles as they decay.

Radon-222 (hereinafter referred to as "Radon") decays through a chain of daughter products (hereinafter, and in the claims, referred to as "radon-daughters"), which are members of the uranium series. Those radon daughters of immediate interest are polonium-218, $\alpha$-emitter, half-life 3.05 minutes, lead-214, $\beta$-emitter, half-life 26,8 minutes, bismuth-214, $\beta(\alpha)$-emitter, half-life 19,7 minutes, and polonium-214, $\alpha$-emitter, half-life 164 microseconds.

Radon-222, and above all the radon daughters polonium-218 and polonium-214, is of significance because, due to the alpha radiation given off, it represents a health risk which cannot be ignored when present in high concentrations in air which is breathed by people. People who work in mines and other localities situated beneath the earth's surface are particularly exposed to alpha radiation from radon and radon daughters. People who live in or visit dwelling houses or working locations situated on the ground and having elevated radon and radon-daughter concentrations can also be subjected to unacceptable levels of alpha radiation from radon and radon daughters, however.

Problems associated with radiation exposure due to inhaling a radon-containing atmosphere are discussed thoroughly in a document entitled "Control of Radon and Daughters in Uranium Mines and Calculations on Biologic Effects", published 1957 by the U.S. Department of Health, Education and Welfare (Public Health Service Publication Nr 494). Latter day investigations, carried out in order to supplement information in the aforementioned publication, have led to the conclusion that an observed, abnormal occurrence of lung cancer among uranium workers may be caused by alpha radiation from radon and radon daughters present in the air inhaled by the workers.

In the air breathed for example by miners underground radon and radon daughters are present in proportions which, in addition to being dependent on those natural relationships in respect of the radioactive decay products, are also dependent on how often the air is changed and on the possibility of radon daughters collecting on walls of the location in which the miners are found and on solid objects in said location. From the radiological aspect, the radon daughters are by far more dangerous than the radon gas, since subsequent to being inhaled they do not immediately accompany the air exhaled, as thus the noble gas radon. The reason for this is that the radon daughters as opposed to radon, are able to adhere to particles of dust etc., which readily fasten to the finest parts of the lungs and bronchial tubes of the human body.

Various kinds of electronic equipment have long been used to register the presence of alpha particles. This known equipment is expensive, bulky and normally requires the use of trained operators, and may also require the application of special sampling techniques. Photographic film has also been used to detect the presence of radon, said film due to the light-sensitive emulsion thereof being able to register alpha particles from radon and daughter products. This film, however, must be packed in a light-proof container, and darkroom techniques must be observed. Consequently, the use of photographic film is unsuitable and relatively expensive. Because of this there have later been proposed methods and apparatus in which the presence and concentration of radon and radon daughters is determined by detecting emitted alpha particles with the use of certain types of track detectors. This particle-registering method utilizes a homogenous material in which a track is formed when a charged particle, for example an alpha particle, passes through the material. The material may be a crystalline, solid substance, such as mica or an non-crystalline substance, such as organic glass or polymeric plastics. If the detector material is irradiated with charged particles, fine tracks are formed in the material by local changes in the material structure along the paths travelled by the particles. The tracks may be enlarged and made visible by means of a reagent which attacks the changed material (which holds the tracks) more quickly than it attacks the unchanged material around said tracks.

Cellulose nitrate is a material which is particularly useful for selective registration of alpha particles, besides being inexpensive and readily available. Etching, for the purpose of enlargening the tracks, can be effected rapidly and simply under daylight conditions, with the use of a common reagent, such as 6 N sodium hydroxide.

These methods have later been refined, to enable the radiation dosages obtained to be accurately registered. Thus, it is known from SE,B, 336688 to use a thin cover-film, which is fastened to and located over part of the track detector. The purpose of the cover film is to obstruct alpha particles having an energy of about 5.5 MeV or less, so that said particles are not able to form tracks. Such a cover film will only permit alpha particles from the radon daughters polonium-218 and polonium-214 to pass through, which means that the covered detector will only measure the radon daughter concentration.

The alpha particles are only able to travel a relatively small distance in air. For example, alpha particles from polonium-214 have an energy of 7.68 MeV and a transit range in air of about 6.5 cm. If the distance at which an alpha particle detector is placed from alpha-emitting solid bodies, such as an ore body, is greater than the aforementioned range the registration of alpha particles will depend on the presence of alpha-emitting, radioactive nuclei which have reached the detector from a remote source by convection or diffusion through the air. The half-life of radon is sufficient to permit transport over a substantial distance, before the radioactivity ceases, and radon is the only alpha-emitting gas normally found in appreciable quantities in bodies containing uranium. Thus, alpha tracks will only be formed on an insulated track-registering material by radon or its alpha-emitting daughter products, and the material can therefore be used as a radon detector and dosimeter.

One serious disadvantage with the use of nuclear radiation registering detectors, such as cellulose nitrate, in personal dosimeters, for registering radon and radon daughters is that the dosimeter, irrespective of whether the detector is uncovered or covered with an absorber, can give erroneous information concerning the dose obtained by the wearer. This problem, however, can be readily eliminated in accordance with the invention by preventing the build-up of static electricity on the detector.

The present invention relates to a method of detecting alpha-emitting substances, such as radon and/or radon daughters, in restricted environment and to a device for detecting the presence of said alpha-emitting substances with an alpha-particle registering material, optionally covered with one absorber or several absorbers with different thicknesses. The characterizing features of the invention are set forth in the following claims.

It lies within the scope of the invention for the detector having the alpha-particle registering material to be provided with an electrically conducting material arranged on or immediately externally of the surface on which the presence of said radiation is to be registered. The electrically conductive material may suitably have the form of a layer on said surface, arranged so as to at least partially cover said surface. This layer may be applied as a thin metal layer, e.g. with the aid of known metallizing processes.

It also lies within the scope of the invention to arrange in front of the detector at least one absorber which is either totally electrically conductive or only partially electrically conductive. In the latter case the absorbers may comprise several sections or layers where in each case the outermost layer is made of an electrically conductive material.

The purpose of the electrically conductive layer is to prevent the occurrence of local electrostatic fields at the detector. Such electrostatic fields externally of the detector create disturbances in the content of radon daughters in the air in front of the detector and in the absorption of radon daughters on the detector surface. These disturbances occur as soon as the conditions in the atmosphere, in which the measurements are taken, are favourable to the build-up of electrostatic fields at the electrically nonconductive absorber—or cellulose nitrate—plastics layer. The detector is calibrated in environments where the radon daughter content is known.

The dosimeter, with the alpha-track registering material and the electrically conductive, thin layers arranged thereon, is placed in a mine or some other locality in which the atmosphere is to be monitored; for example the dosimeter can be carried by a mine worker. Subsequent to a suitable exposure time, the alpha tracks are enlarged and made visible by etching the registering material, whereafter the tracks are counted to obtain a measurement of the presence and concentration of radon also the concentration of and its alpha-emitting daughter products. The whole of this procedure may be carried out in day-light conditions and with the use of inexpensive and readily obtainable material, such as to enable small quantities of radon to be detected.

Although the theoretic background of the invention has not yet been fully established, the invention will be illustrated in the following by a theoretical approach to radon- radon daughter dosimeters in general.

When equilibrium prevails between radon and radon daughters, as occurs when the change in ambient air takes place slowly, i.e. when the time taken to replace contaminated ambient air with fresh air is longer than the half-life of the radon daughters, and the volume of air is so great that adsorption of the radon daughters on surfaces, such as walls and like structures, in the area, the radon decay is $R_j$ units per second and per unit volume, while the radon-daughter decay is $D_j$ units per second and per unit volume.

The relationship between these two decay rates can be expressed as $$D_j = k \cdot R_j \qquad (1)$$

(only $\alpha$-decay being calculated), where k is a constant between about 1.8 and 2.

If the plastics film on the detector is covered with an absorber which is so thin that radon daughters adsorbed on its surface are not registered on the film, the relationship $$k_R \cdot R_j + k_D \cdot D_j = H_f^e \qquad (2)$$

will be registered, where $k_R$, $k_D$ are each efficiency factors for the registration of $\alpha$-particles emanating from radon and radon-daughter decay.

The relationships (1) and (2) result in the relationship $$k_R \cdot R_j + k_D \cdot k \cdot R_j = H_f^e \qquad (3)$$

If the plastics film is covered with an absorber of such thickness that radon present in the air in front of the absorber is not registered, radon daughters adsorbed on the surface of the absorber and radon daughters present in the air in front of the absorber are registered. In this case there is registered $$c_D \cdot D_j = H_f^d \qquad (4)$$

where $c_D$ is a factor determined by adsorption of the radon daughters on the surface of the absorber, the registering efficiency, and the thickness of the adsorber. $H_f^d$ is the number of holes (tracks) per unit area in the plastics film when covered by the thick absorber.

The relationships (1)+(4) result in $$c_D \cdot k \cdot R_j = H_f^d$$

In those instances when there is no equilibrium between radon and radon daughters, due either to rapid changes in air conditions or to the adsorption of radon daughters on structural surfaces for example, the total decay will be $R_i$ radon decay per second and unit volume, $D_o$ radon-daughter decay per second and unit volume.

The amount of radon daughters is reduced relative to a state of equilibrium.

$$D_i = x \cdot k \cdot R_i \qquad (5)$$

where x is a reduction factor ($0 \leq x \leq 1$).

In operation, the plastics film is covered with a thin or a thick absorber, as in the case when registering at equilibrium.

When registration is effected with a thin absorber $$k_R \cdot R_i + k_D \cdot D_i = H_f^e \qquad (6)$$

The relationships (5) and (6) result in $$k_c \cdot R_i + k_D \cdot x \cdot k \cdot R_i = H_i^e \qquad (7)$$

$H_i^e$ is the number of holes (tracks) in the plastics film per unit area, when the film is covered with a thin absorber.

When registration is effected with the thick absorber $$c_D \cdot D_i = H_i^d \qquad (8)$$

The relationships (5)+(8) result in $$c_D \cdot x \cdot k \cdot R_i = H_i^d \qquad (9)$$

$H_i^d$ is the number of holes (tracks) in the plastics film per unit area, when the film is covered with the thick absorber.

The relationships (3), (4), (7) and (9) result in $$H_j^e = R_j(k_R + k \cdot k_D) \qquad (3)$$

$$H_j^d = R_j \cdot k \cdot c_D \qquad (4)$$

$$H_i^e = R_i(k_R + x \cdot k \cdot k_D), \text{ and} \qquad (7)$$

$$H_i^d = R_i(k_x \cdot c_D) \qquad (9)$$

Thus it can be derived from the transit ranges of α-particles that $$k_R = k_D$$

Then $\dfrac{H_i^d}{H_i^e} \cdot \dfrac{H_j^e}{H_j^d} = \dfrac{(1+k)x}{1+k \cdot x}$ The reduction factor x of the radon daughters can be obtained from the equation $$x = \dfrac{\alpha}{1 + k(1-\alpha)} \text{ where } \alpha = \dfrac{H_i^e}{H_i^e} \cdot \dfrac{H_j^e}{H_j^d}$$

With the aid of the above theory, x has been determined in respect of four mutually different test locations, where $h^d/H^e$-relationships were measured

| Location | $H^d/H^e$ | x (%) |
| --- | --- | --- |
| Telescope Chamber | 2.59 | 68 |
| Tank 62 | 3.02 | 102 |
| Location 9-92 | 1.93 | 38 |
| Pump Station | 2.45 | 60 |

The above calculations are only examples of how the radon-daughter content/radon content can be determined.

The invention will now be described with reference to the accompanying drawing.

Figure 1:
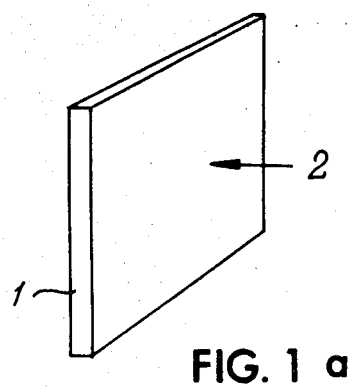
FIG. 1a illustrates a device for measuring radon and-/or radon daughters with an electrically conductive layer applied to a layer of cellulose nitrate.
FIG. 1b illustrates a second embodiment of the invention.
Figure 1:
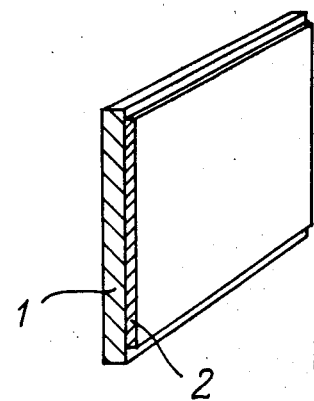
Figure 2:
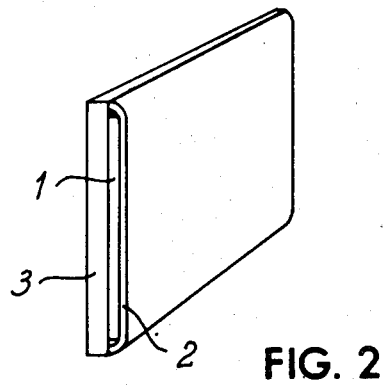
FIG. 2 illustrates a third embodiment of the invention.

FIG. 1 illustrates a device for measuring radon and-/or radon daughters, in which the detector is a film of cellulose nitrate plastics 1. The cellulose nitrate film is coated with an electrically conductive layer 2. The electrically conductive layer 2 may comprise a thin metal film, applied onto the surface of the cellulose nitrate film (FIG. 1a). It may also comprise a metal foil of uniform thickness or some other electrically conductive material, or non-conductive material in combination with conductive material, for example a plastics material having an electrically conductive outer layer which will not damage the plastics surface, either mechanically or chemically (FIG. 1b). The device for measuring radon and/or radon daughters illustrated in FIG. 2 has a detector which comprises a film of cellulose nitrate plastics 1 covered with an electrically conductive layer 2. The cellulose nitrate detector is arranged on a metal plate 3 which is larger than the cellulose nitrate detector. The metal plate 3 and the layer 2 are connected to each other in an electrically conductive manner.

Figure 3:
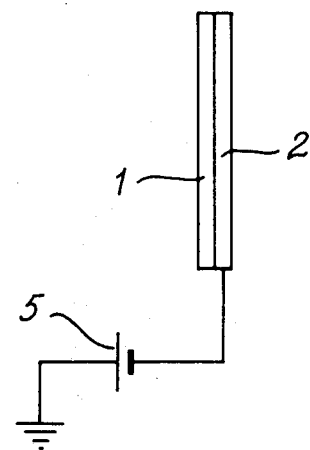
FIG. 3 illustrates a fourth embodiment of the invention.

The radon-daughter measuring device in FIG. 3 has a detector made of cellulose nitrate plastic 1 and covered with an electrically conductive layer 2, whereat the thickness of said layer is such as to permit radon daughters to be registered but not radon-222. The detector is arranged on a metal plate (not shown). Between the detector and the surroundings is an electrical potential difference created by a battery 5 or some other voltage source. The potential difference increases the probability of catching radon daughters on the outer detector surface, and therewith increases the statistical accuracy of the measurements being taken. The detector is calibrated in an environment in which the content of radon daughters is known.

Figure 4:
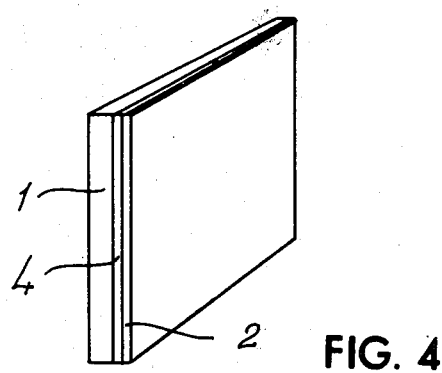
FIG. 4 illustrates a fifth embodiment of the invention.

FIG. 4 illustrates a device for measuring radon daughters in which the detector is a film of cellulose nitrate plastics 1 coated with an absorber 4 and having an electrically conductive layer 2. The absorber 4 shall cover the cellulose nitrate plastics (1) and has properties such that radon daughters which are free or are adhered to particles of dust fasten to the outer surface of said absorber. The absorber 4 may comprise two or more absorber layers of different thickness, which permits a separation of radon and radon daughters. The cellulose nitrate detector can be placed on a metal foil, which is preferably larger than the detector. Radon, which is a noble gas, will not fasten to the surface of the electrically conductive layer. The thickness of the absorber is such that alpha particles originating from the decay of radon-222 in the air nearest the absorber surface can never be registered. The thickness of the absorber shall also be such that alpha particles from radon daughters located on the outer absorber surface or in a small volume of air in front of the absorber surface are able to be registered in the cellulose nitrate film, when they penetrate the absorber within a specific solid angle, in a direction at right angles to the plastics surface. These conditions can be fulfilled simultaneously, since alpha particles originating from radon-222 have a lower energy and shorter range in material than do alpha particles from radon daughters. The radon-daughter measuring device is calibrated in an environment in which the radiation is known.

I claim:

1. A method for detecting and measuring alpha-emitting substances, such as radon and/or daughter products of radon, by registering nuclear tracks on a detector, characterized by conducting away during the measuring any electrostatic fields which may have built up at the detector.

2. A device for detecting alpha-emitting substances, such as radon and/or daughter products of radon by registering nuclear tracks on a detector characterized in that arranged on or in the immediate vicinity of the detector, on the surface intended for registering received alpha particles, is an electrically conductive material which at least partially covers said surface.

3. A device according to claim 2 for selectively detecting daughter products of radon by registering nuclear tracks on a dielectric film detector having arranged thereon at least one absorber for absorbing alpha particles of low energy, characterized in that the absorber is arranged between the film detector and the electrically conductive material.

4. A device according to claim 3, characterized in that at least part of the absorber is electrically conductive.

5. A device according to claim 4, characterized in that the electrically conductive layer is arranged directly on the surface of the absorber for registering alpha radiation received on the detector.

6. A device according to any one of claims 2–5, characterized in that the electrically conductive material has a constant electric potential.

7. A device according to any one of claims 2–5, characterized in that the electrically conductive material is connected to the ground.

8. A device according to claim 6, characterized in that the electrically conductive material is connected to a source of electric voltage.

* * * * *